M. T. & E. B. SHIELDS & W. L. McGUIRE.
OVERTHROW HAY RETAINER.
APPLICATION FILED APR. 29, 1911.
1,025,320.
Patented May 7, 1912.
2 SHEETS—SHEET 1.
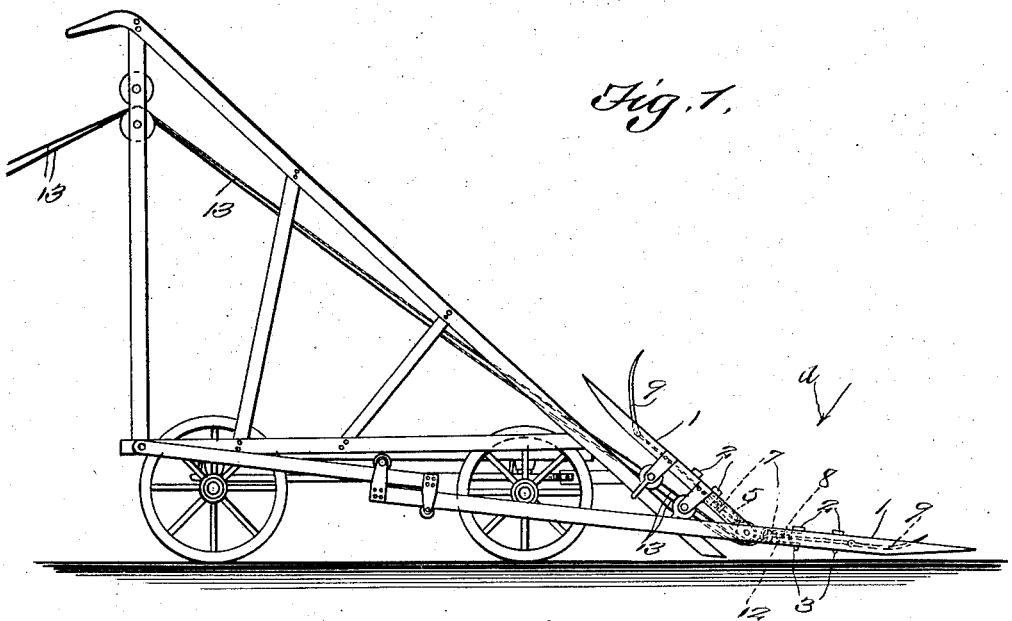
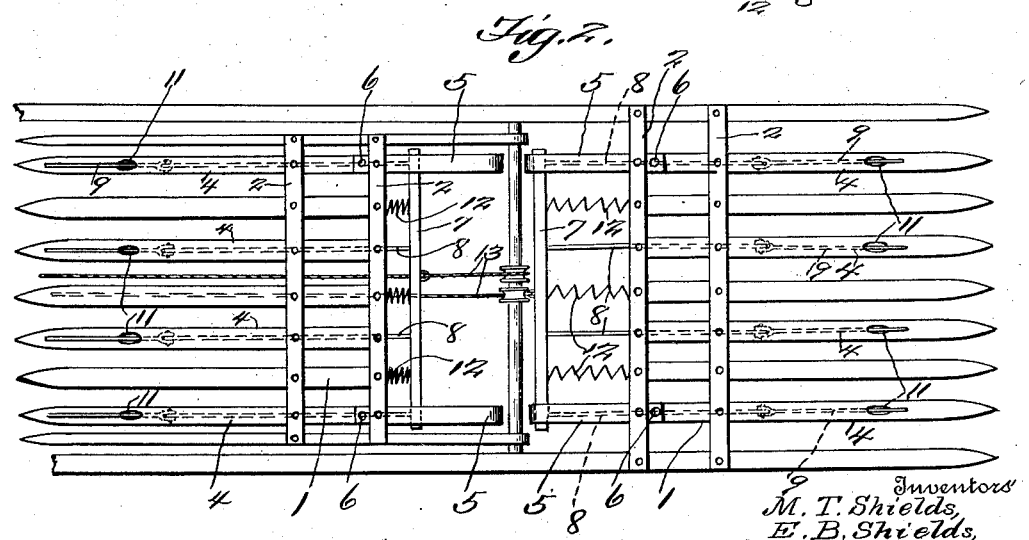
Witnesses
Inventors
M. T. Shields,
E. B. Shields,
and W. L. McGuire,
By D. Swift & Co.
Attorneys

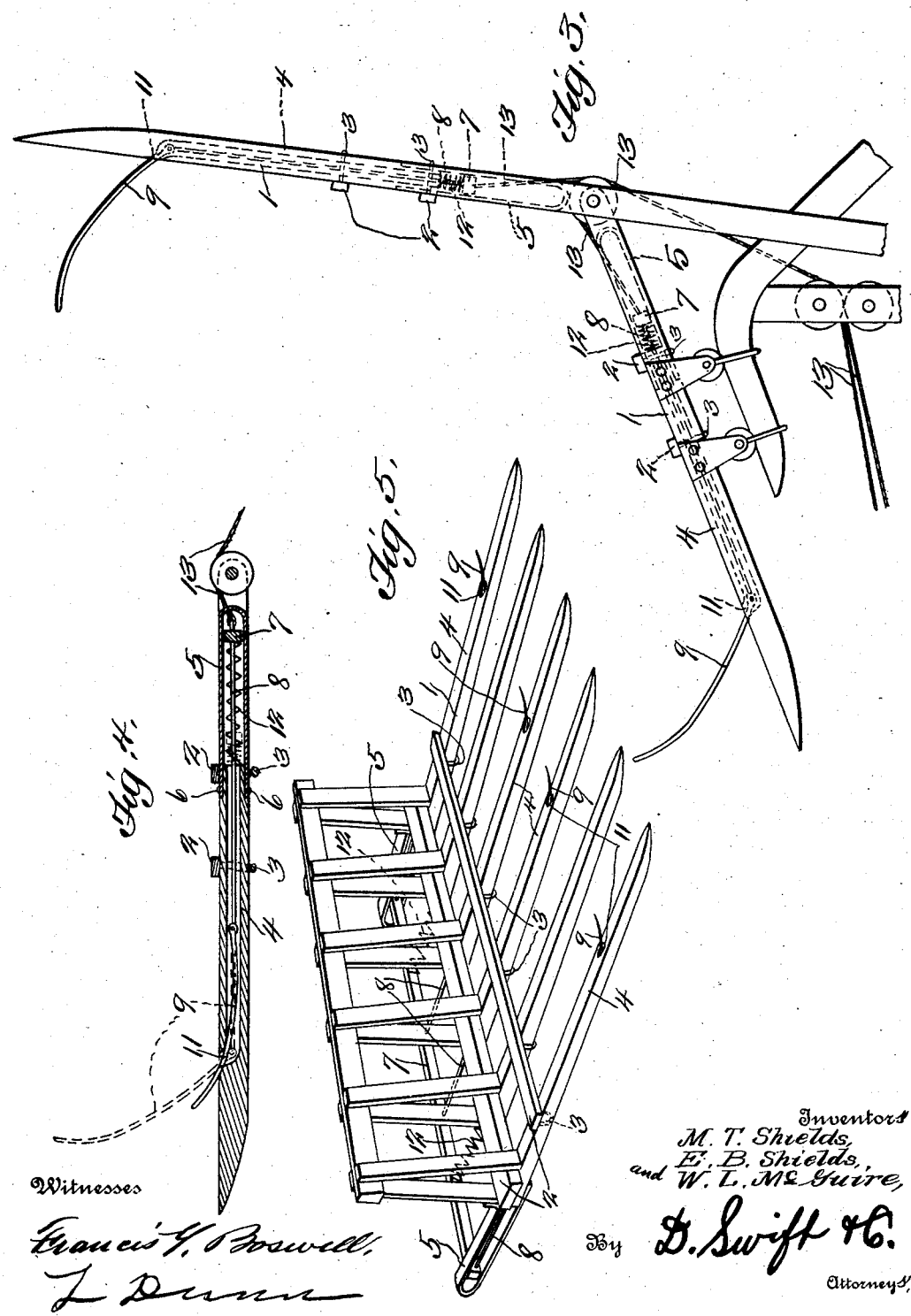

# UNITED STATES PATENT OFFICE.

MARION T. SHIELDS, EDGAR B. SHIELDS, AND WILLARD L. McGUIRE, OF OSBORNE, KANSAS.

OVERTHROW HAY-RETAINER.

1,025,320.

Specification of Letters Patent.

Patented May 7, 1912.

Application filed April 29, 1911. Serial No. 624,196.

*To all whom it may concern:*

Be it known that we, MARION T. SHIELDS, EDGAR B. SHIELDS, and WILLARD L. McGUIRE, citizens of the United States, residing at Osborne, in the county of Osborne and State of Kansas, have invented a new and useful Overthrow Hay-Retainer; and we do hereby declare the following to be a full, clear, and exact description of the invention, such as will enable others skilled in the art to which it appertains to make and use the same.

This invention relates to a new and useful hay retainer adapted for use in connection with a hay fork of any construction of hay stacker. This hay retainer may also be applied to sweep rakes or the like. In the drawings, however, the hay retainer is shown in connection with the fork of an overshot haystacker, as the preferred application of the device. The hay retainer is also shown as applied to the fork of a different design of hay stacker.

The invention in its broadest scope, aims to provide, as its main object, a hay retainer adapted for holding the hay on the rake, after it is swept thereon by a sweep rake (not shown), until it is released.

A further object of the invention is to provide a fork with a number of hollow teeth arranged alternately between solid teeth. The object of providing the hollow teeth is to arrange rods slidably in them, in order to permit pivoted extensions of the rod to be extended through slots or openings of the hollow teeth, when the rods are arranged in one position, for the purpose of retaining the hay on the fork, and to withdraw the pivoted extensions through the slots or openings into the hollow teeth when the rods are arranged in a different position. In the drawings, however, there is only disclosed one form of the invention, but in practical fields, this form may require alterations, to which the applicant is entitled, provided the alterations are comprehended by the appended claim.

The invention comprises further features and combination of parts hereinafter set forth, shown in the drawings and claimed.

In the drawings:—Figure 1 is a view in elevation, showing an overthrow haystacker including the fork, with the hay retainer applied to the fork, the hay retainer being constructed in compliance with the invention and showing the same in its lowermost position. Fig. 2 is a plan view of the two part fork looking in the direction of the arrow *a* in Fig. 1, showing one of the retainers receded into the forks while the other is extended. Fig. 3 is a fragmentary view of a portion of the haystacker, showing the fork in its uppermost position, with both the hay retainers extended. Fig. 4 is an enlarged detailed sectional view through a fork, in order to disclose the hay retainer. Fig. 5 is a view in perspective of a fork adapted for use in connection with a hay stacker other than an overthrow stacker, showing the hay retainer as applied thereto.

More especially referring to the drawings, the numeral 1 designates the fork of a hay stacker. This fork comprises the transverse beams 2, which are secured to the teeth of the fork by means of the U-shaped staples 3.

The hollow forks 4 are arranged alternately between the solid forks, and secured to the hollow forks are the guide loops 5. The guide loops 5 are secured to the hollow forks by means of the members 6. Slidably arranged in the loops is a movable beam 7, from which the rods 8 project. These rods 8 extend into the hollow forks, and are supplied at their ends with pivoted slightly curved extensions 9. When the movable beam is forced to the beams 2, the extensions extend through the slots or openings 11 of the hollow teeth, in order to retain hay on the fork. These pivoted extensions may be of any desired length, in order to hold the hay on the fork. The normal position of the movable beam is adjacent the beams 2, and is held in such position by means of the spring 12, thus holding the pivoted extensions normally extended through the slots or openings. To draw the pivoted extensions into the hollow rods, suitable cables or ropes 13 are provided, which are attached to the movable beam. The free end of the rope or cable may be arranged in close position to the operator of the haystacker.

When loading the fork by means of a rake sweep (not shown) the pivoted extensions are withdrawn into the hollow teeth, until the fork is loaded, then they are allowed to extend through the openings, so as to retain the hay on the fork, until the fork is elevated. After the fork is elevated, the pivoted extensions are drawn within the hollow teeth, thus permitting the release of the hay.

From the foregoing it is to be observed that there has been a simple, efficient, durable and practical hay retainer devised, and one which may be withdrawn out of sight when releasing the hay, so as to remove all obstructions as the hay is being dumped.

The invention having been set forth, what is claimed as new and useful, is:—

In a hay fork, a plurality of alternately arranged hollow and solid teeth, the hollow teeth being provided with openings at one of their ends, rods slidably arranged in the hollow teeth and provided with pivoted curved members extensible through the openings, guide loops arranged at the rear of the fork at each end, a cross beam guided in the loops and connecting the rods in the hollow teeth, and means connected between the beam and a portion of the fork for holding the pivoted extensions normally extended.

In testimony whereof we have signed our names to this specification in the presence of two subscribing witnesses.

MARION T. SHIELDS.
EDGAR B. SHIELDS.
WILLARD L. McGUIRE.

Witnesses:
   GLADYS E. McARDLE,
   CHAS. BUELL.

---

Copies of this patent may be obtained for five cents each, by addressing the "Commissioner of Patents, Washington, D. C."